(12) United States Patent
Daughtridge et al.

(10) Patent No.: US 9,130,624 B2
(45) Date of Patent: Sep. 8, 2015

(54) ENVELOPE FEEDBACK INTERFERENCE REDUCTION AND DATA THROUGHPUT MAXIMIZATION

(71) Applicant: Kratos Integral Holdings, LLC, San Diego, CA (US)

(72) Inventors: Stuart Daughtridge, Huntingtown, MD (US); Robert Potter, Los Altos, CA (US)

(73) Assignee: Kratos Integral Holdings, LLC, San Diego, CA (US)

( * ) Notice: Subject to any disclaimer, the term of this patent is extended or adjusted under 35 U.S.C. 154(b) by 210 days.

(21) Appl. No.: 13/843,393

(22) Filed: Mar. 15, 2013

(65) Prior Publication Data

US 2014/0086359 A1    Mar. 27, 2014

Related U.S. Application Data

(60) Provisional application No. 61/704,313, filed on Sep. 21, 2012.

(51) Int. Cl.
*H04B 15/00* (2006.01)
*H03K 9/00* (2006.01)
(Continued)

(52) U.S. Cl.
CPC ............ *H04B 1/0475* (2013.01); *H04B 1/1036* (2013.01); *H04B 1/123* (2013.01); *H04L 27/0012* (2013.01)

(58) Field of Classification Search
USPC ................. 375/219, 221, 222, 229–236, 240, 375/240.02, 240.04–240.05, 375/240.25–240.29, 259, 285, 295, 316, 375/338, 339, 340, 344, 346, 345, 354, 220, 375/284, 296, 311, 348, 349, 350
See application file for complete search history.

(56) References Cited

U.S. PATENT DOCUMENTS 7,031,370 B1 *   4/2006   Fukumasa ..................... 375/141
7,639,761 B2 * 12/2009   Chu et al. ..................... 375/346
(Continued)

FOREIGN PATENT DOCUMENTS

WO          01/63777 A2      8/2001
WO     WO 0163777 A2 *      8/2001
(Continued)

OTHER PUBLICATIONS

International Search Report and Written Opinion for related PCT application No. PCT/US2013/060980, mailed on Feb. 7, 2014, in 10 pages.

(Continued)

*Primary Examiner* — Linda Wong
(74) *Attorney, Agent, or Firm* — Procopio Cory Hargeaves & Savitch LLP

(57) ABSTRACT

Reducing interference on an input signal which includes a desired signal and an interfering signal, including: processing the input signal in frequency and time domain to separate the desired signal from the interfering signal by: characterizing the interfering signal without a priori knowledge of characteristics of the interfering signal; generating a clean copy of a carrier of the input signal using the characterized interfering signal; inverting the clean copy of the carrier and correcting for gain and phase; and summing the inverted clean copy of the carrier with the input signal to generate an output signal which is substantially close to the desired signal, wherein the generated output signal has adequate signal-to-noise ratio (SNR) so that it can be processed.

17 Claims, 9 Drawing Sheets

(51) Int. Cl.
  *H04L 27/06* (2006.01)
  *H04B 1/04* (2006.01)
  *H04B 1/10* (2006.01)
  *H04B 1/12* (2006.01)
  *H04L 27/00* (2006.01)

(56) References Cited

U.S. PATENT DOCUMENTS

| | | | | |
|---|---|---|---|---|
| 8,433,015 | B2 * | 4/2013 | Downey et al. | 375/346 |
| 2006/0067446 | A1 * | 3/2006 | Maeda et al. | 375/349 |
| 2006/0121946 | A1 * | 6/2006 | Walton et al. | 455/561 |
| 2009/0122928 | A1 * | 5/2009 | Twitto | 375/344 |
| 2009/0175465 | A1 | 7/2009 | Kwon et al. | |
| 2011/0135043 | A1 | 6/2011 | Downey et al. | |
| 2012/0076220 | A1 * | 3/2012 | Kimura et al. | 375/260 |
| 2013/0294494 | A1 * | 11/2013 | Wang | 375/233 |

FOREIGN PATENT DOCUMENTS

| | | |
|---|---|---|
| WO | 2008/053414 A1 | 5/2008 |
| WO | WO 2008053141 A1 * | 5/2008 |

OTHER PUBLICATIONS

A World Leader in Satellite Interference Detection and Carrier Monitoring Systems, SAT Corporation, SatMagazine, May 2008.
Digital Spectrum Analysis for Interference Detection and Analysis, SAT Corporation, Aug. 2005.
Bob Potter, Reducing Interference in Satellite Communication, SAT Corporation.

* cited by examiner

ENVELOPE FEEDBACK INTERFERENCE REDUCTION AND DATA THROUGHPUT MAXIMIZATION

CROSS-REFERENCE TO RELATED APPLICATIONS

This application claims the benefit of priority under 35 U.S.C. §119(e) of U.S. Provisional Patent Application No. 61/704,313, filed Sep. 21, 2012, entitled "Envelope Feedback Interference Reduction and Data Throughput Maximization." The disclosure of the above-referenced application is incorporated herein by reference.

BACKGROUND

1. Field of the Invention

The present invention relates to interference reduction, and more specifically, to envelope feedback interference reduction associated with signal separation.

2. Background

Communications engineers face a number of challenges today, including maximizing the amount of information that can be communicated over the limited resources available. With limited frequencies available over which to communicate radio signals, and with the amount of information that people wish to communicate growing rapidly, it is important to use the available frequencies as efficiently as possible. Unfortunately, for a variety of reasons, the available frequencies are often interfered with, causing the loss of valuable frequency space. This is an issue that causes hundreds of millions of dollars in financial losses to the satellite industry alone.

One way by which interference can be reduced is to put as much separation as possible between each pair of potentially interfering signals. Such separation may be, for example, by separating the signals by frequency, physical distance, or the like. However, separating signals in these ways can reduce the amount of information that can be transmitted between a transmitter and a receiver, because the efficiency with which information can be transmitted over the communication system may be diminished.

SUMMARY

The present invention provides for envelop feedback interference reduction with signal separation to reduce the impact of interference and to enable maximum data throughput. The methods are frequency independent.

In one implementation, a method of reducing interference on an input signal which includes a desired signal and an interfering signal is disclosed. The method includes: processing the input signal in frequency and time domain to separate the desired signal from the interfering signal by: characterizing the interfering signal without a priori knowledge of characteristics of the interfering signal; generating a clean copy of a carrier of the input signal using the characterized interfering signal; inverting the clean copy of the carrier and correcting for gain and phase; and summing the inverted clean copy of the carrier with the input signal to generate an output signal which is substantially close to the desired signal, wherein the generated output signal has adequate signal-to-noise ratio (SNR) so that it can be processed.

In another implementation, a signal characterization and separation system to process an input signal, comprising a desired signal and an interfering signal, in frequency and time domain to separate the desired signal from the interfering signal is disclosed. The system includes: signal characterization unit configured to characterize the interfering signal without a priori knowledge of characteristics of the interfering signal; and a signal separation unit configured to generate a clean copy of a carrier of the input signal using the characterized interfering signal, to invert the clean copy of the carrier and correct for gain and phase, and sum the inverted clean copy of the carrier with the input signal to generate an output signal which is substantially close to the desired signal, wherein the generated output signal has adequate signal-to-noise ratio (SNR) so that it can be processed.

In a further implementation, a non-transitory computer-readable storage medium storing a computer program for reducing interference on an input signal which includes a desired signal and an interfering signal is disclosed. The computer program includes executable instructions that cause a computer to: process the input signal in frequency and time domain to separate the desired signal from the interfering signal by executable instructions that cause the computer to: characterize the interfering signal without a priori knowledge of characteristics of the interfering signal; generate a clean copy of a carrier of the input signal using the characterized interfering signal; invert the clean copy of the carrier and correcting for gain and phase; and sum the inverted clean copy of the carrier with the input signal to generate an output signal which is substantially close to the desired signal, wherein the generated output signal has adequate signal-to-noise ratio (SNR) so that it can be processed.

Other features and advantages of the present invention will become more readily apparent to those of ordinary skill in the art after reviewing the following detailed description and accompanying drawings.

DETAILED DESCRIPTION

Figure 1A:
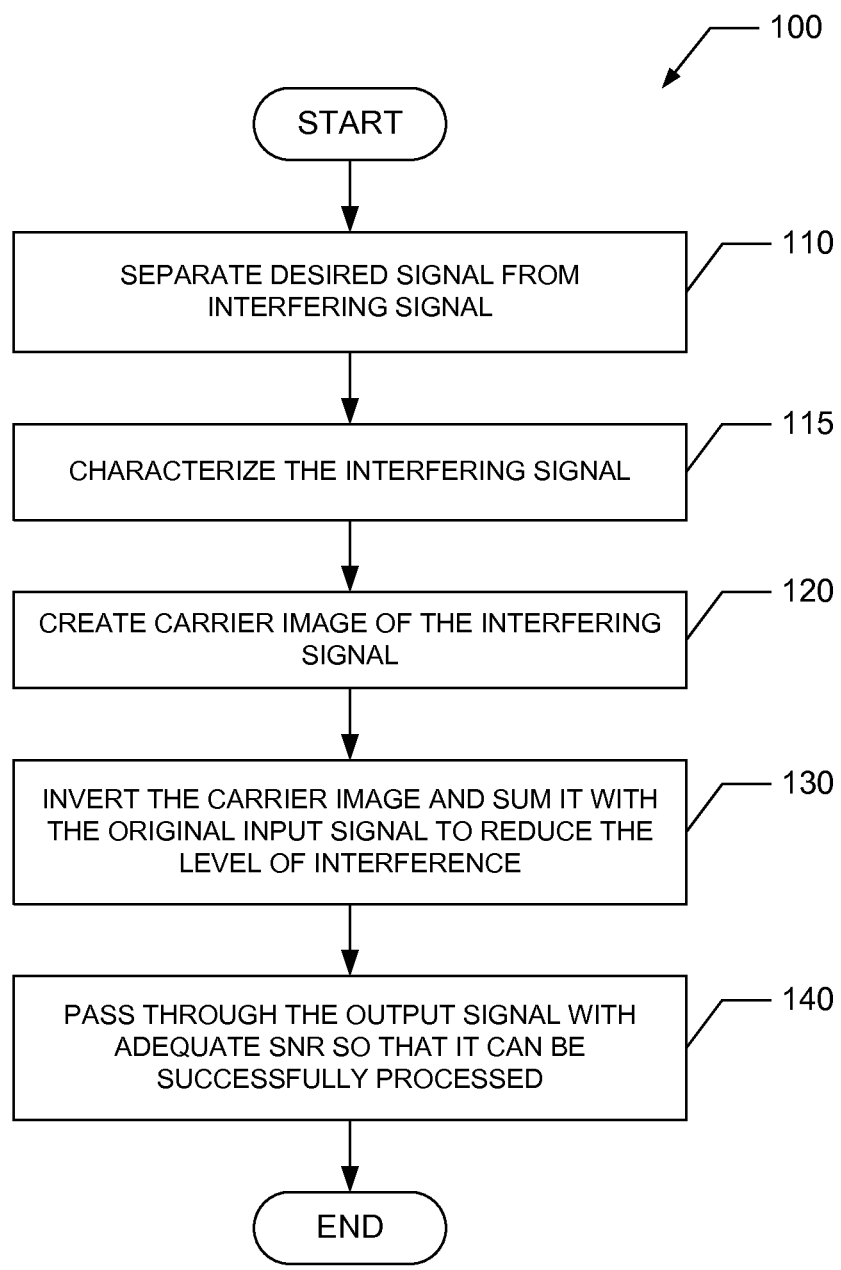
FIG. 1A is a flow diagram illustrating an envelope feedback interference reduction technique in accordance with one implementation of the present invention.

As discussed above, separating the signals to reduce interference by frequency or physical distance can reduce the amount of information that can be transmitted between a transmitter and a receiver. Further, if the interfering signal is from an unknown (as is typically the case) or hostile source, separating signals in these ways may not be possible.

Certain implementations as described herein provide for envelop feedback interference reduction and data throughput maximization, and associated "blind" dual-carrier signal separation and processing. The term "blind" as used in this context refers to processing and/or reduction of a signal without a priori knowledge of the characteristics of the signal. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, the envelop feedback interference reduction (EFIR) technique has applications in multiple different communications systems including, but not limited to: satellite communications signals and satellite command and control (C2) links; unmanned aerial vehicle (UAV) line of sight (LOS) and satellite data links; shipboard microwave and satellite communications systems; microwave communications links; GPS receivers; cellular phone communications links; cable signals; and any point-to-point or point-to-multipoint RF systems that are susceptible to interference (accidental or intentional). It also can be used to allow "blind" dual-carrier signal processing that allows significantly higher data rates to be transmitted through a satellite transponder or other fixed RF bandwidth link than single carrier transmission. The term "blind" as used in this context refers to processing and/or reduction of a signal without a priori knowledge of the characteristics of the signal.

The unique elements of the interference detection and signal separation technique include: blindly determining the characteristics of the signals passing through an amplifier; separating the wanted signal from a residual which may contain the effects of interference and potentially amplifier compression; canceling the effects of an interfering carrier that causes both the interference and potentially compression within a receiver amplifier; and recovering a signal that is compromised either or both from interference and compression due to the operation on the receiver amplifier. Further, combinations of the above-listed elements can be identified as unique elements as well. However, key technical challenges in implementing this technique include: separating and creating the canceling signal in real-time, especially if there is distortion from the low-noise amplifier (LNA); synchronizing the canceling signal with the interfering signal; and closing the loop fast enough to cancel out modulated interfering signals, and when necessary, separating the target signal from the remainder of the cancelled interfering signal.

FIG. 1A is a flow diagram illustrating an envelope feedback interference reduction technique 100 in accordance with one implementation of the present invention. In the illustrated implementation of FIG. 1A, the technique 100 separates the desired signal from the interfering signal, at box 110. Then, at box 115, the interfering signal is characterized.

In one implementation, the signal characterization (e.g., box 115) involves processing the input signal in frequency domain to determine the presence of the signal and to determine signal bandwidth and carrier frequency. The carrier frequency is measured by measuring the signal raised to an incremental power (e.g., 1, 2, 4, 8, etc.). That is, the signal is multiplied by itself a number of times until a continuous-wave (CW) signal can be seen. Once the frequency measurement is successful, the current power index provides a hint about the modulation type (e.g., 1=CW, 2=BPSK, 4=QPSK, etc.), even though further measurements may be necessary to disambiguate some modulations (e.g., between QPSK and 16QAM). Further, the process also provides a hint about the carrier clock rate. Therefore, once the modulation type and the carrier clock (symbol rate) are determined, the signal can be reprocessed to measure accurately the carrier modulation type and clock rate, which provide the carrier symbol trajectory. In addition to the measurement of the carrier, a copy of the residual (interference) carrier is generated.

The residual signal is reprocessed in the same way as the original input signal to separate out the interfering carrier, at box 120, using the carrier symbol trajectory. The clean copy of the carrier is then inverted and corrected for gain and phase, and summed with the original composite signal, at box 130, to reduce the level of interference on the input signal (which originally the interfering signal level was substantially close enough to the desired signal to cause processing problems). At box 140, the output signal is passed through with adequate signal-to-noise ratio (SNR) so that it can be successfully processed (such that the residual signal [interfering signal] level is reduced so that it does not materially impact processing of the desired signal).

The envelope feedback interference reduction technique 100 can be alternatively described as a method 150 (see FIG. 1B) of reducing interference on an input signal by creating a clean copy of the most powerful carrier (wanted signal), reprocessing the residual carrier to separate out other carriers, determining the wanted signal and the unwanted signal and using the unwanted signal (inverted in phase and adjusted for gain) to cancel it out via envelope feedback. The method 150 includes: processing the input signal in frequency and time domain to separate the desired signal from the interfering signal, at box 160; characterizing the interfering signal without a priori knowledge of the characteristics of the interfering signal, at box 165; generating a clean copy of a carrier of the input signal using the characterized interfering signal, at box 170; inverting the clean copy of the carrier and correcting for gain and phase, at box 180; and summing the inverted clean copy of the carrier with the input signal, at box 190, to generate an output signal which is substantially close to the desired signal, wherein the generated output signal has adequate signal-to-noise ratio (SNR) so that it can be processed.

Figure 2:
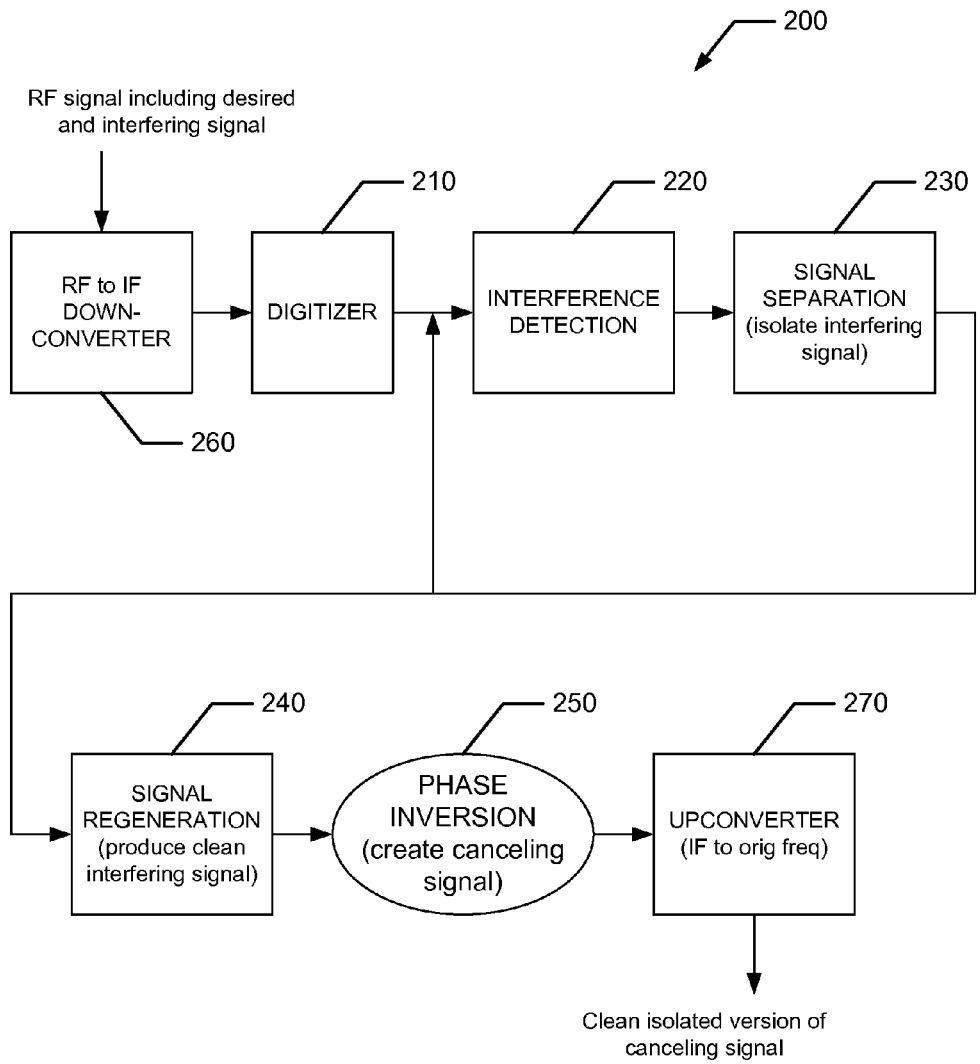
FIG. 2 is a detailed functional block diagram of the interference detection and signal separation unit in accordance with one implementation of the present invention.

FIG. 2 is a detailed functional block diagram of an interference detection and signal separation unit 200 in accordance with one implementation of the present invention. The unit 200 is configured similarly to an interference detection and signal separation unit 350 of FIG. 3. In this implementation, the signal including the desired and interfering signals is received by a down-converter 260 to convert the RF signal into an IF signal. A digitizer 210 digitizes the IF signal and sends the digitized signal to an interference detection unit 220, which is configured to detect an interfering signal. A signal separation unit 230 is configured to isolate the interfering signal. The output of this unit 230 is then fed back into the unit 220 to maintain the loop. The output is also fed into a signal regeneration unit 240 to produce clean interfering signal, which is received by a phase inversion unit 250 to create a canceling signal. An up-converter 270 converts the canceling signal from the IF to the original RF (if required). Although the unit 200 of FIG. 2 shows the signal being down-converted to IF before it is processed and being up-converted back to RF once the processing is done, it should be noted that the processing can be done all in RF without the need for down-converter and up-converter. The down-converter is only required for high frequency signal (e.g. Ghz signals) because of limitation in the speed of current digitizers, such that they can only digitize up to Mhz frequencies. The methods are frequency independent and (with current digitizer technology) applications of signals in the hundreds of megahertz and below will not require any frequency conversion).

Figure 3:
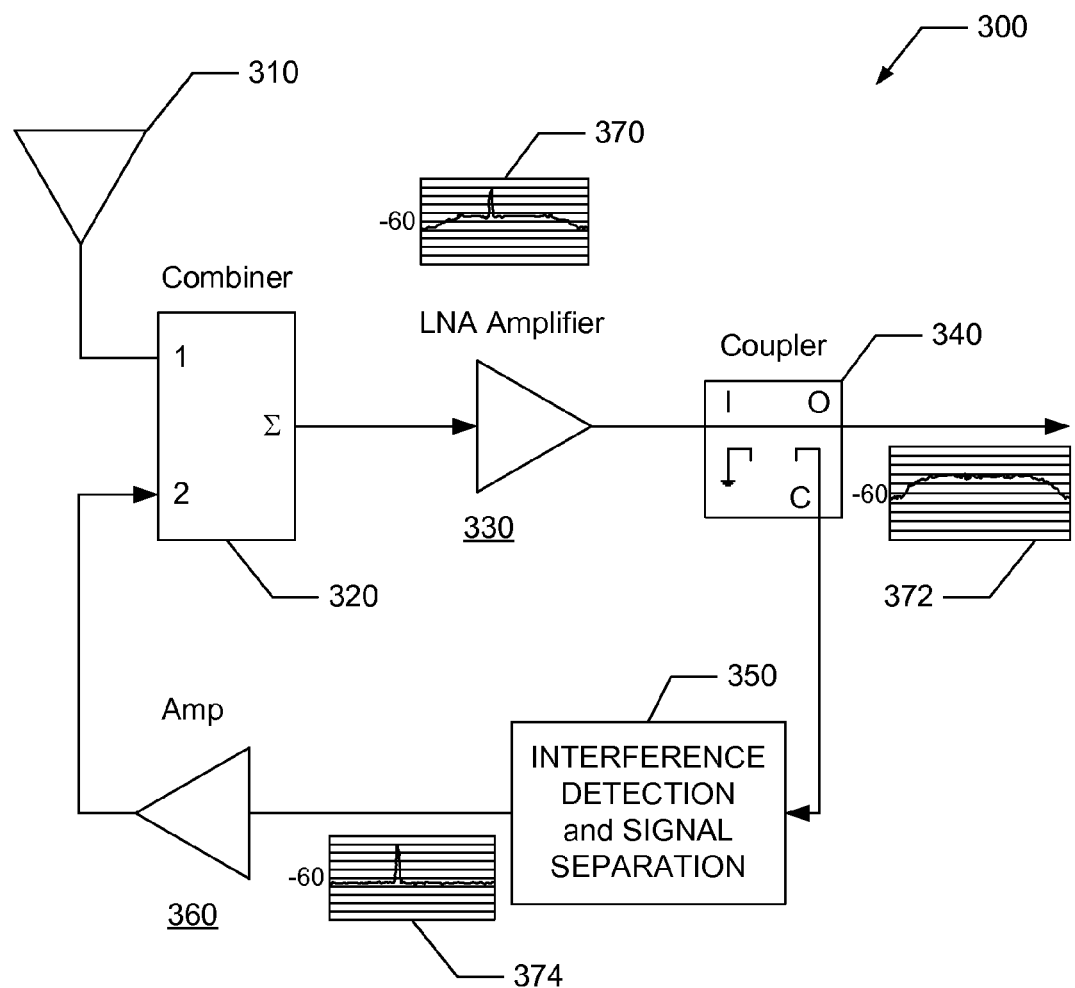
FIG. 3 is a functional block diagram of an envelope feedback interference reduction system in accordance with one implementation of the present invention.

FIG. 3 is a functional block diagram of an envelope feedback interference reduction system 300 in accordance with one implementation of the present invention. This implementation takes into account compression from the LNA because of an overdrive condition caused by the interfering signal. The system 300 is designed to address the key challenges of separating and creating the canceling signal in real-time, synchronizing the canceling signal with the interfering signal, and closing the loop fast enough to cancel out both continuous wave and modulated interfering signals. Accordingly, the system 300 includes an antenna 310 which receives an input signal (see 370) including desired and interfering signals, and an interference detection and signal separation unit 350 (the design of unit 350 may be similar to that of unit 200 of FIG. 2) to detect the interfering signal and subtract it from the input signal.

The design of an envelope feedback interference reduction system may vary depending on the location of the interference detection and signal separation unit. For example, the interference reduction system will be substantially similar to the design of the envelope feedback interference reduction system 300 shown in FIG. 3, when the location of the interference detection and signal separation is around the LNA 330. This configuration will be useful for applications where the LNA will be saturated by the interfering signal causing distortion of the output of the LNA. The signal distortion will impact the desired signal, such that the canceling signal must be removed before the LNA to prevent the distortion. Thus, the effects from the distortion will need to be taken into account in the creation of the canceling signal. No delay circuit can be used, which means that the speed of the feedback circuit will drive what type of signal that can be cancelled, and will limit the applicability of this configuration to allow operations through interference.

Figure 4:
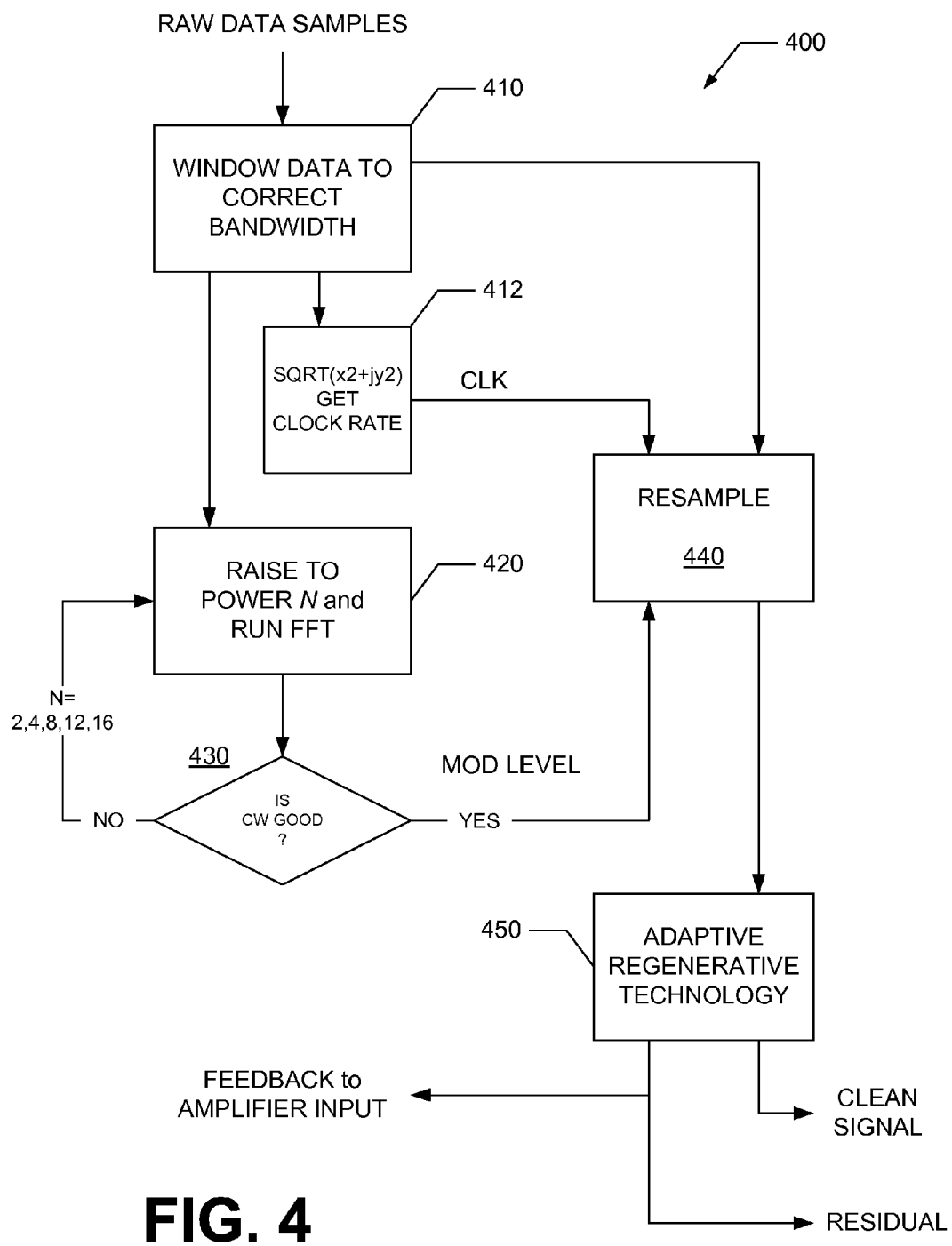
FIG. 4 is a functional block diagram of a blind signal characterization and signal separation system configured in accordance with one implementation of the present invention.

FIG. 4 is a functional block diagram of a "blind" signal characterization and signal separation system 400 configured in accordance with one implementation of the present invention. The system 400 is configured similarly to the interference detection and signal separation unit 350 of FIG. 3. In the illustrated implementation of FIG. 4, the system 400 includes a data windowing unit 410, a clock generator 412, a Fourier transform unit 420, a decision unit 430, a re-sampling unit 440, and an adaptive regenerative unit 450. The data windowing unit 410 and the clock generator 412 are configured to receive the raw signal and process it in time domain to band limit the signal.

The data windowing unit 410 (window data to correct bandwidth) is configured to process the signal in the frequency and time domain to determine the presence of the signal and to determine signal bandwidth and center frequency.

The Fourier transform unit 420 and the decision unit 430 are configured to process the signal in time domain to determine the modulation characteristics, and accurately measure the carrier frequency by measuring the signal raised to an incremental power (e.g., 1, 2, 4, 8, etc.). That is, the signal is multiplied by itself a number of times until a continuous-wave (CW) signal can be seen. Once the frequency measurement is successful, the current power index provides a hint about the modulation type (e.g., 1=CW, 2=BPSK, 4=QPSK, etc.), even though further measurements may be necessary to disambiguate some modulations (e.g., between QPSK and 16QAM). Further, the process also provides a hint about the carrier clock rate. Therefore, once the modulation type and the carrier clock (symbol rate) are determined, the signal can be reprocessed by the re-sampling unit 440 (e.g., an equalizer) to measure accurately the carrier modulation type and the clock rate, which enable it to follow the carrier symbol trajectory.

The adaptive regenerative unit 450 performs a signal separation task using the carrier symbol trajectory. That is, the unit 450 generates a clean copy of the carrier (wanted signal) using the carrier symbol trajectory. A signal equalizer is built and clocked at X times the carrier clock rate. The unit 450 inverts and corrects the clean copy for gain and phase and sums it with the original composite signal. The output is the residual (interfering) signal, which is adjusted for gain and phase and fed back to the input of the LNA. The LNA output signal has a greatly reduced interfering signal such that LNA compression is avoided and the SNR is sufficient to allow processing of the residual (target) signal. If the target signal is still not adequate but there is at least 6 db of separation between the residual signal and the remaining interfering signal after cancellation, the signal separation technique can be added to the output of the LNA to create a clean version of the residual (target) signal.

Referring back to FIG. 3, the effects of interferences and distortions (see 374) are canceled in an amplifier 360 and a combiner 320. The amplifier 360 inverts the residual signal and corrects for gain and phase. The combiner 320 sums the modified residual with the input signal and provides the output to a low-noise amplifier (LNA) 330 (and through to a coupler 340) to cancel the unwanted signals thus reducing the energy into the LNA to eliminate the signal compression. Although the initial attempts may not cancel all interferences and distortions, the system 300 will eventually settle to produce an output signal (see 372) with substantially reduced interferences and distortions after several iterations around the loop. The loops will need to be continuously updated to track and correct changes in the interfering signal that may be due to changes related to it being a modulated signal, changes to signal level from changes to the transmission path, and changes in frequency due to Doppler or it being a sweeping signal. The speed at which the loops can settle will determine the effectiveness of the cancellation. But with the separation and regeneration capability at the output, only a 6 db separation is required to allow the system to regenerate the residual (target) signal.

Figure 5:
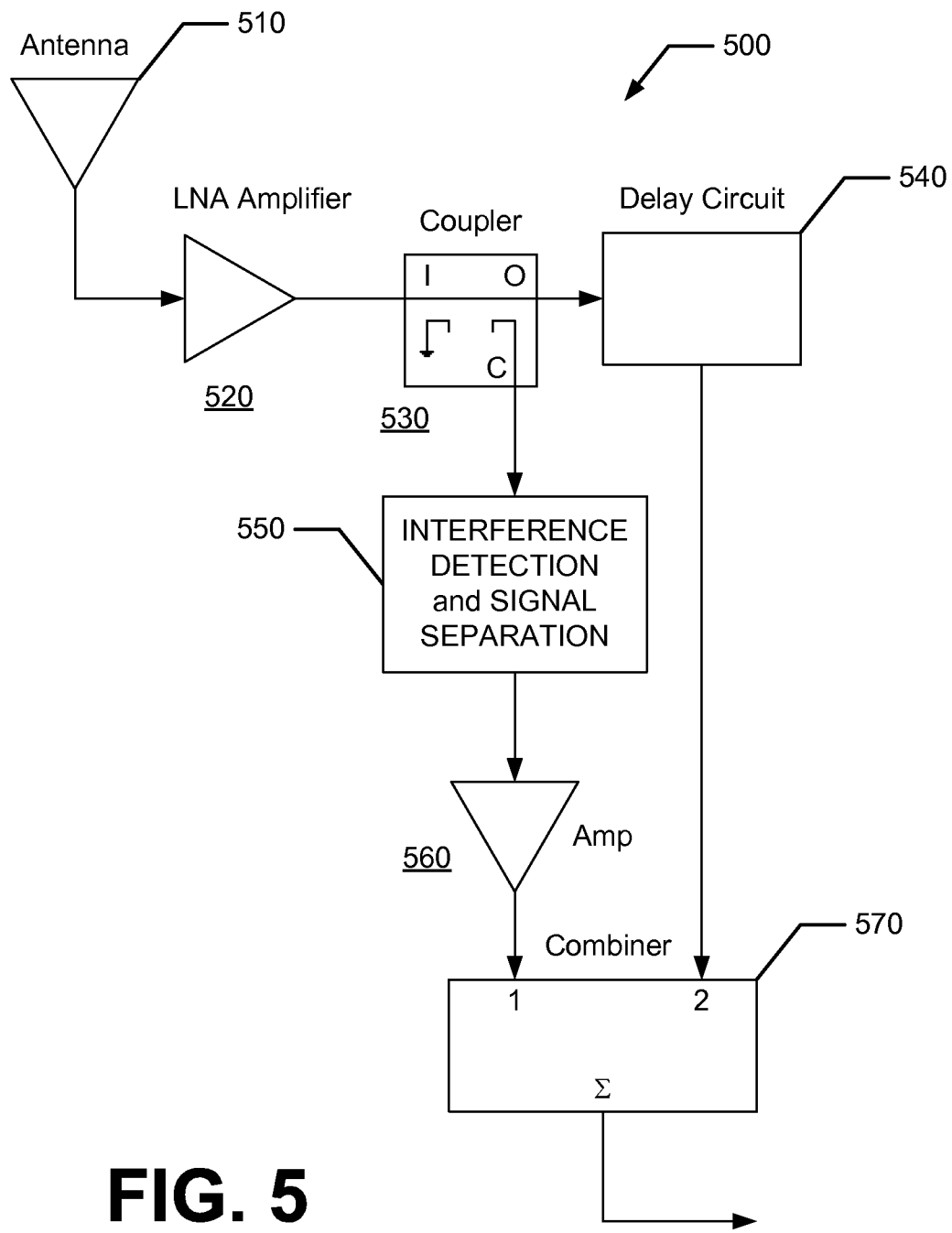
FIG. 5 is a functional block diagram of an envelope feedback interference reduction system in accordance with another implementation in which the location of the interference detection and signal separation is after the LNA.

FIG. 5 is a functional block diagram of an envelope feedback interference reduction system 500 in accordance with another implementation in which the location of the interference detection and signal separation is after the LNA 520. In this implementation, it is unlikely that an interfering signal will saturate the LNA 520, and there is no signal distortion cause by the amplifier compression. Further, the signal is not reduced to an IF signal level, such as on traditional bent pipe communications satellites, to deal with uplink interference, or with microwave and cell phone relay/repeater stations applications. Thus, this implementation would be applicable where a short delay in the transmission is acceptable. Accordingly, the envelope feedback interference reduction system 500 includes an antenna 510 which receives an input signal including desired and interfering signals, and an interference detection and signal separation unit 550 that is substantially similar to the unit 200 shown in FIG. 2.

In the illustrated implementation of FIG. 5, the system 500 includes a short delay circuit 540 which receives and inserts a short delay in the input signal from the LNA 520 (through a coupler 530). The effects of interferences and distortions are canceled in an amplifier 560 and a combiner 570. The amplifier 560 inverts the residual signal and corrects for gain and phase. The combiner 570 sums the modified residual with the delayed input signal to cancel the interferences and distortions from the input signal. The combiner 570 outputs a desired signal with adequate signal-to-noise ratio (SNR) so that it can be successfully processed.

Figure 6:
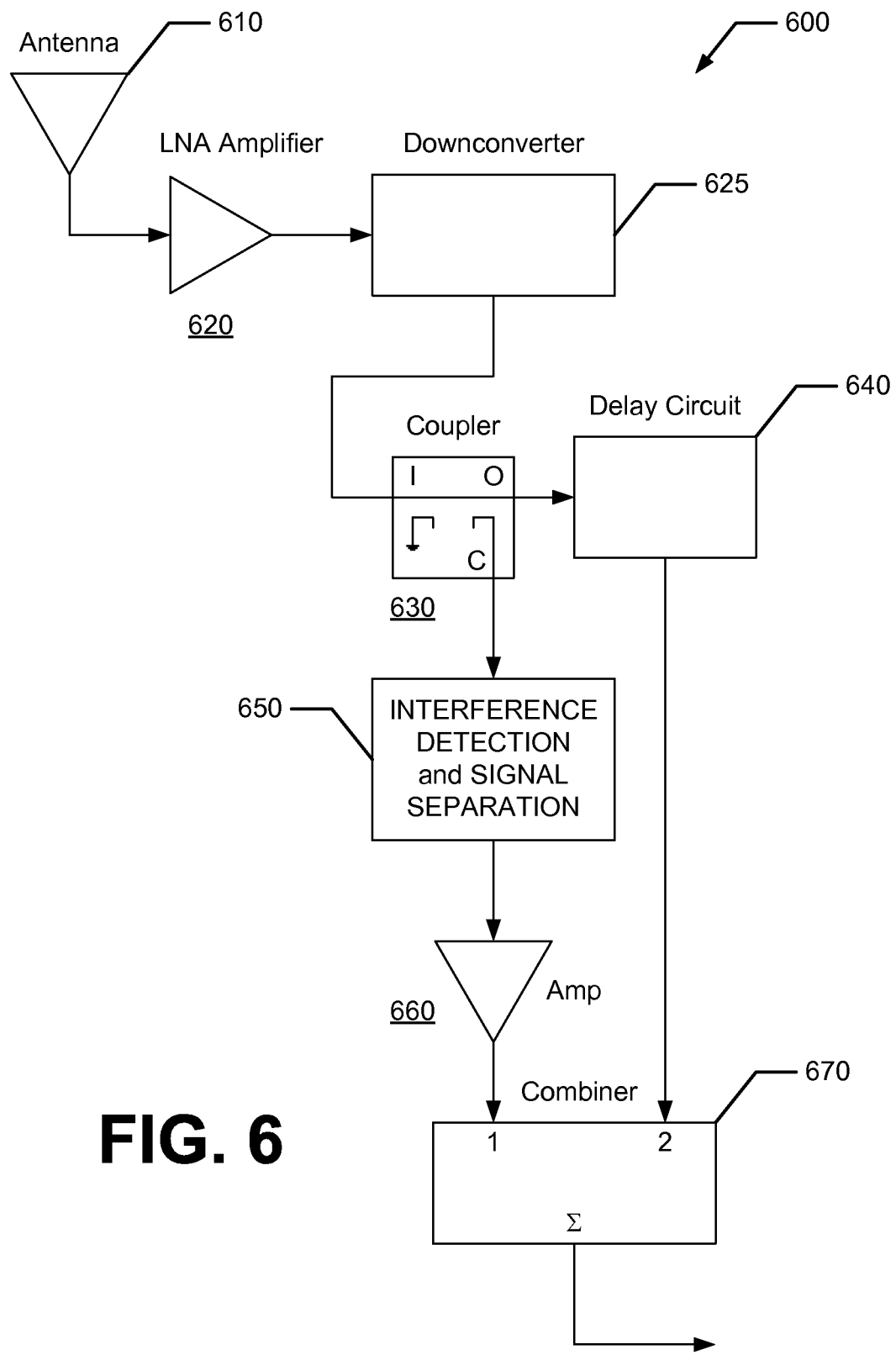
FIG. 6 is a functional block diagram of an envelope feedback interference reduction system in accordance with yet another implementation in which the location of the interference detection and signal separation is at the intermediate frequency (IF) level.

FIG. 6 is a functional block diagram of an envelope feedback interference reduction system 600 in accordance with yet another implementation in which the location of the interference detection and signal separation is at the intermediate frequency (IF) level. Thus, in this implementation, the interference detection and signal separation does not need RF/IF down- and up-conversion processes. Accordingly, this implementation is applicable to all end point RF communication and information receiver systems. This implementation is also applicable to blind dual-carrier communications systems including radio receivers, satellite terminals/modems, GPS receivers, airborne (aircraft, UAV, missiles) line of RF sight communications, maritime/shipboard communications systems (satellite and line of sight), cellular phones base stations and receivers, WiMax receivers, microwave radios, and RF over wire, cable, waveguide systems. This implementation also includes a short delay circuit 640 in the primary path to allow detecting signal changes and responses.

In the illustrated implementation of FIG. 6, the system 600 includes an antenna 610 which receives an input signal including desired and interfering signals. This input signal is passed to the LNA 620, to a down-converter 625, and then to an interference detection and signal separation unit 650 through a coupler 630. The system 600 also includes a short delay circuit 640 which receives and inserts a short delay in the input signal from the down-converter 625. The effects of interferences and distortions are canceled in an amplifier 660 and a combiner 670. The amplifier 660 inverts the residual signal and corrects for gain and phase. The combiner 670 sums the modified residual with the delayed input signal to cancel the interferences and distortions from the input signal. The combiner 670 outputs a desired signal with adequate signal-to-noise ratio (SNR) so that it can be successfully processed. It should be noted that the interference detection and signal separation unit 650 processes the signal in intermediate frequency since the input signal is down-converted in the down-converter 625.

Figure 7:
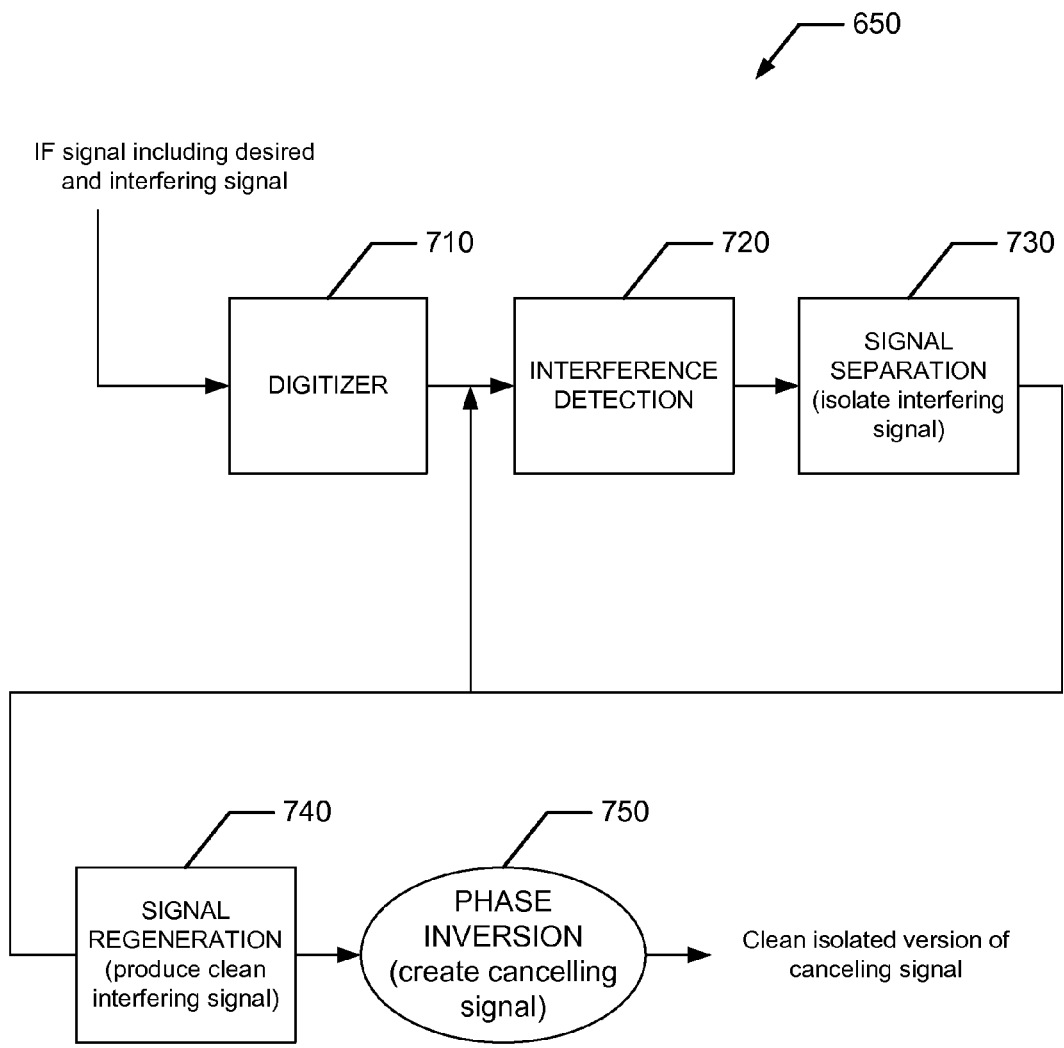
FIG. 7 is a detailed functional block diagram of the interference detection and signal separation unit (shown in FIG. 6) in accordance with one implementation of the present invention.

FIG. 7 is a detailed functional block diagram of the interference detection and signal separation unit 650 (shown in FIG. 6) in accordance with one implementation of the present invention. In this implementation, the IF signal including the desired and interfering signals is received by a digitizer 710 which digitizes the IF signal and sends the digitized signal to an interference detection unit 720, which is configured to detect an interfering signal. A signal separation unit 730 is configured to isolate the interfering signal. The output of this unit 730 is then fed back into the unit 720 to maintain the loop. The output is also fed into a signal regeneration unit 740 to produce clean interfering signal, which is received by a phase inversion unit 750 to create an isolated version of the canceling signal.

Figure 8A:
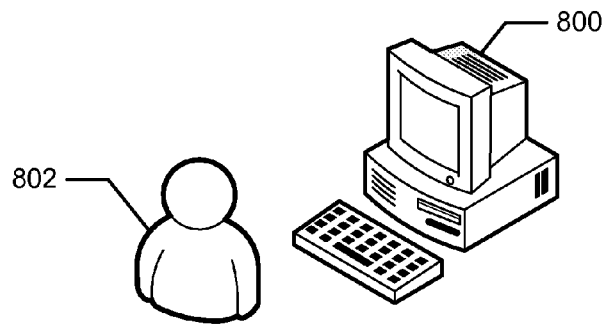
FIG. 8A illustrates a representation of a computer system and a user.

FIG. 8A illustrates a representation of a computer system 800 and a user 802. In one implementation, the user 802 uses the computer system 800 to perform envelope feedback interference reduction.

Figure 1B:
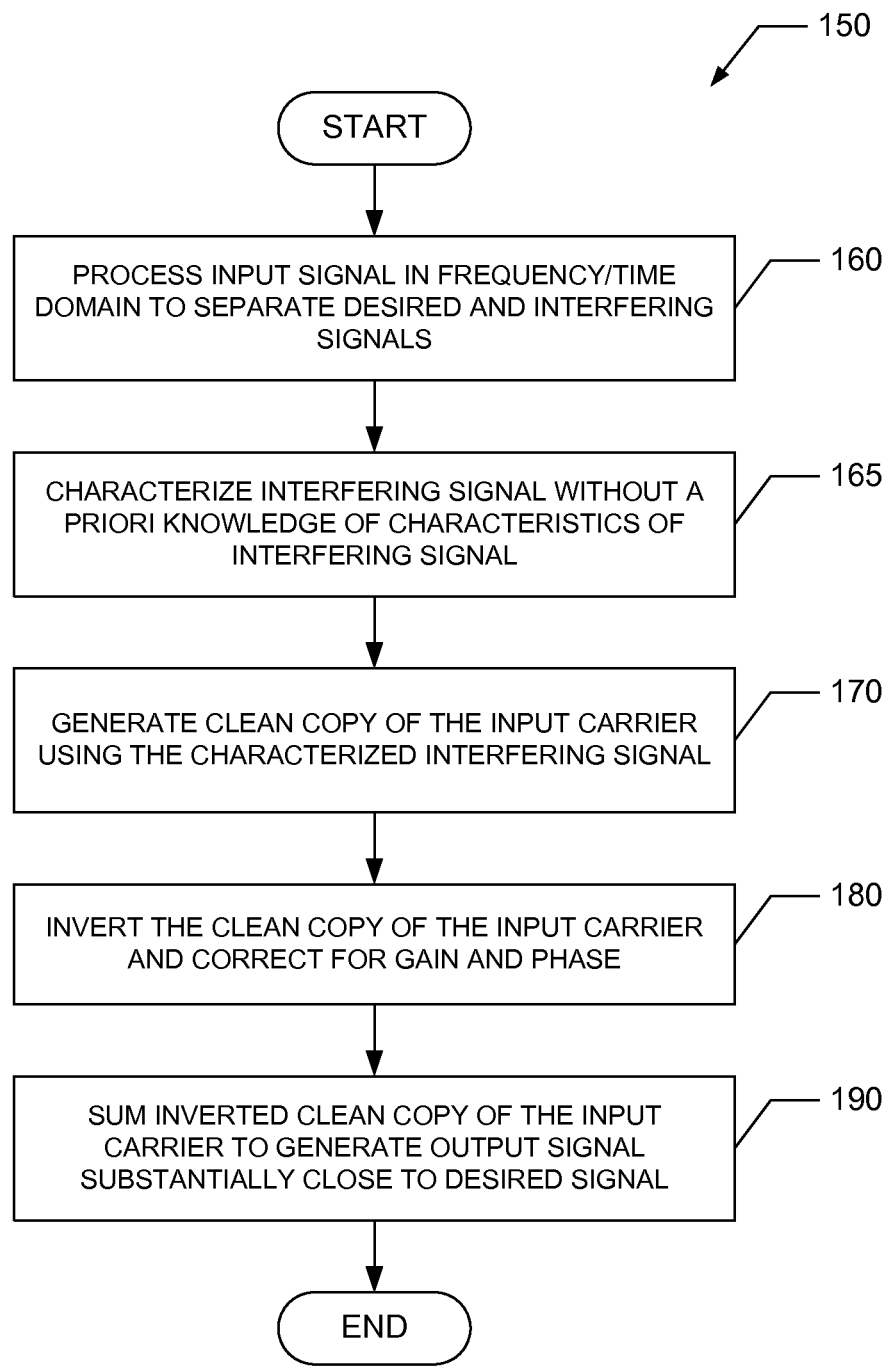
FIG. 1B is a flow diagram illustrating alternative description of the envelope feedback interference reduction technique as a method of reducing interference on an input signal.
Figure 8B:
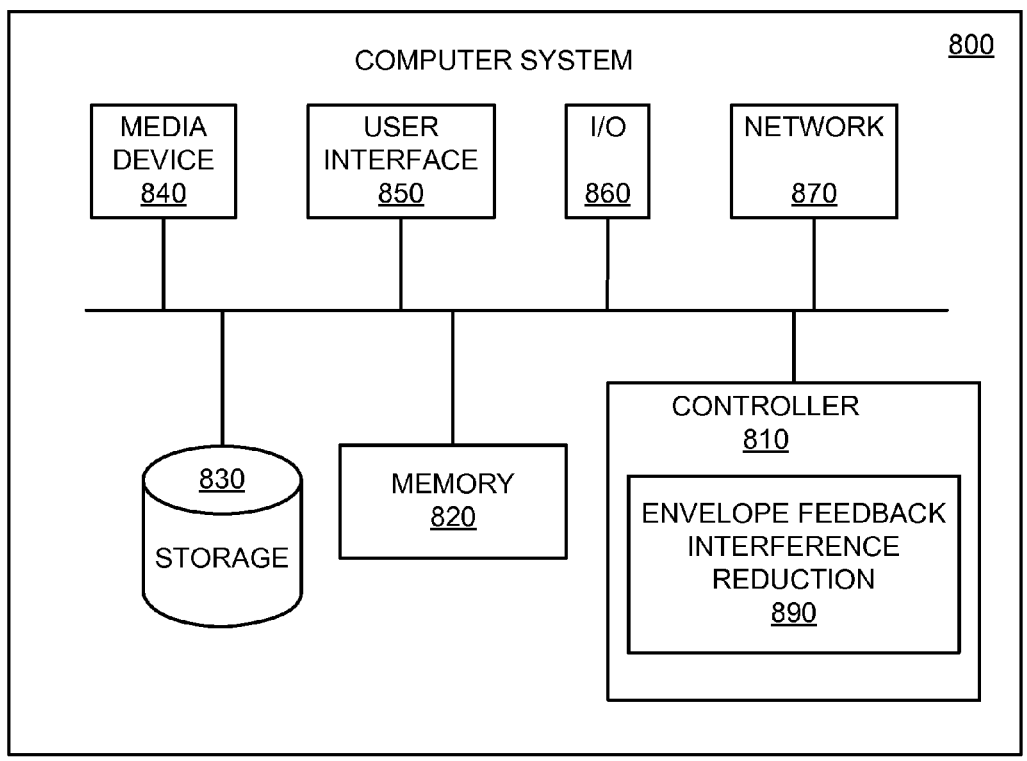
FIG. 8B is a functional block diagram illustrating an envelope feedback interference system to perform envelope feedback interference technique which can be hosted on a computer system or in field programmable gate array (FPGA)/application-specific integrated circuit (ASIC).

FIG. 8B is a functional block diagram illustrating the envelope feedback interference system 890 to perform envelope feedback interference technique (e.g., as illustrated in FIG. 1A or FIG. 1B). This technique can be hosted on a computer system or in field programmable gate array (FPGA)/application-specific integrated circuit (ASIC). The controller 810 is a programmable processor and controls the operation of the computer system 800 and its components. The controller 810 loads instructions (e.g., in the form of a computer program) from the memory 820 or an embedded controller memory (not shown) and executes these instructions to control the system.

Memory 820 stores data temporarily for use by the other components of the computer system 800. In one implementation, memory 820 is implemented as RAM. In another implementation, memory 820 also includes long-term or permanent memory, such as flash memory and/or ROM.

Storage 830 stores data temporarily or long term for use by other components of the computer system 800, such as for storing data and program of the envelope feedback interference system 890. Storage 830 is sometimes referred to as a computer-readable storage medium which stores non-transitory data. In one implementation, storage 830 is a hard disk drive.

In its execution, the envelope feedback interference system 890 is loaded into the memory 820 or storage 830 as a software system. Alternatively, this service can be implemented as separate hardware components (e.g., field programmable gate array (FPGA)) in the computer system 800.

The media device 840 receives removable media and reads and/or writes data to the inserted media. In one implementation, for example, the media device 840 is an optical disc drive.

The user interface 850 includes components for accepting user input from the user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (including, but not limited to 302.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

In a further implementation, augmentation to the above-described envelop feedback interference reduction includes pulsing off the primary signal for interference characterization. For example, the primary signal is pulsed off periodically when interference is detected or suspected to capture and characterize the interfering signal. During the primary signal off period, full measurement characterization of the interfering signal is performed. A canceling signal (which removes the interference) is then generated by using the measurement characterization of the interfering signal. For example, in the presence of suspected interference, the modem could be operated at a high duty cycle (e.g., 90%, that is modem on for 900 milliseconds and off for 100 milliseconds, for example). During the 100 millisecond off period, the interference is characterized and the interference information is used to create a canceling signal that allows processing of the primary signal for the remaining 900 milliseconds. The duty cycle and the duration of each cycle can be tailored to the application, the rate of change of the interfering signal and the speed of the characterization circuit, such that it possible to foresee (for a highly dynamic interferer) a 50% duty cycle operating with a total cycle time of 1 millisecond or even 10 microseconds. In other implementations, the duty cycle and the cycle duration can be adjusted to maximize the data throughput based on the rate of change in the interfering signal's characteristics and the speed of the characterization circuit.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, although the implementations discussed above focus on canceling the interfering signal, the envelope feedback interference reduction systems and techniques described above can be used to enable cancel each signal individually so that both signals can be processed allowing for a blind dual-carrier process to maximize data throughput on an RF system, or to allow characterize and capture, but not cancel the interfering signal for real-time or post process analysis. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of reducing interference from an interfering signal that overlaps with a desired signal, the method comprising:
   receiving an input signal comprising the desired signal and the interfering signal;
   multiplying the input signal by itself n-number of times to determine a carrier frequency, a symbol rate estimate, and a modulation estimate of the interfering signal, wherein n is an integer;
   generating a copy of the interfering signal based on the carrier frequency, the symbol rate estimate, and the modulation estimate;
   inverting the copy of the interfering signal;
   summing the inverted copy of the interfering signal with the input signal to generate an output signal similar to the input signal having a reduced interfering signal strength.

2. The method of claim 1 further comprising,
   the multiplying of the input signal by itself n-number of times to achieve a continuous-wave (CW) signal, wherein n equals a current power index.

3. The method of claim 2, wherein the current power index indicates the modulation estimate and the symbol rate estimate.

4. The method of claim 3, further comprising
   resampling the input signal at a multiple of the symbol rate to determine a modulation type, a symbol rate and a symbol trajectory.

5. The method of claim 1 further comprising repeating the multiplying of the input signal by itself n-number of times, the generating of the interfering signal, the inverting of the copy of the interfering signal, the correcting of the gain and phase, and the summing of the inverted copy of the interfering signal with the input signal a desired number of times to create a feedback loop to further reduce interference from a second interfering signal.

6. The method of claim 1, further comprising correcting the copy of the interfering signal for gain and phase.

7. A signal characterization and separation system to process an input signal, the input signal comprising an interfering signal that overlaps with a desired signal, the system comprising:
   a receiver configured to receive the input signal;
   at least one processor operably coupled to the receiver and configured to multiply the input signal by itself n-number of times to determine a carrier frequency, a symbol rate estimate, and a modulation estimate of the interfering signal, wherein n is an integer; and
   a signal separation unit operably coupled to the at least one processor and configured to
   generate a copy of the interfering signal based on the carrier frequency, the symbol rate estimate, and the modulation estimate,
   invert the copy of the interfering signal, and
   sum the inverted copy of the interfering signal with the input signal to generate an output signal having a reduced interfering signal strength, the output signal being similar to the desired signal.

8. The system of claim 7, wherein the at least one processor is further configured to multiply the input signal by itself n-number of times to achieve a continuous-wave (CW) signal, wherein n equals a current power index.

9. The system of claim 8, wherein the current power index indicates the modulation estimate and the symbol rate estimate.

10. The system of claim 9, further comprising
    a re-sampling unit configured to reprocess the input signal to determine a modulation type, a symbol rate and a symbol trajectory.

11. The system of claim 10, further comprising an adaptive regenerative unit configured to generate the copy of the interfering signal using the symbol trajectory.

12. The apparatus of claim 7, further comprising a feedback module configured to deliver the output signal to the receiver a number of times.

13. The apparatus of claim 7, wherein the signal separation unit is further configured to correct the copy of the interfering signal for gain and phase.

14. A non-transitory computer-readable storage medium storing a computer program for reducing interference from an interfering signal that overlaps with a desired signal, the computer program comprising executable instructions that cause a computer to:

receive an input signal comprising the desired signal and the interfering signal;

multiplying the input signal by itself n-number of times to determine a carrier frequency, a symbol rate estimate, and a modulation estimate of the interfering signal;

generate a copy of the interfering signal based on the carrier frequency, the symbol rate estimate, and the modulation estimate;

invert the copy of the interfering signal; and sum the inverted copy of the interfering signal with the input signal to generate an output signal which is substantially close to the desired signal, the generated output signal having a reduced interfering signal strength.

15. The non-transitory computer-readable storage medium of claim 14, wherein measuring the input signal raised to an incremental power comprising executable instructions that cause the computer to multiply the input signal by itself n-number of times until a continuous-wave (CW) signal is achieved, wherein the n-number of times is a carrier power index.

16. The non-transitory computer-readable storage medium of claim 15, wherein the current power index indicates the modulation estimate and the symbol rate estimate.

17. The non-transitory computer readable medium of claim 14, wherein the computer program comprising executable instructions that further causes the computer to correct the copy of the interfering signal for gain and phase.

* * * * *